US012780997B2

(12) United States Patent
Zhang

(10) Patent No.: US 12,780,997 B2
(45) Date of Patent: Nov. 3, 2026

(54) WORKPIECE, A WORKPIECE PROCESSING METHOD AND A WORKPIECE PROCESSING SYSTEM THEREOF

(71) Applicant: Nanowall Technology PTE LTD, Singapore (SG)

(72) Inventor: Jun Zhang, Singapore (SG)

(73) Assignee: Nanowall Technology PTE LTD, Singapore (SG)

( * ) Notice: Subject to any disclaimer, the term of this patent is extended or adjusted under 35 U.S.C. 154(b) by 1113 days.

(21) Appl. No.: 17/309,458

(22) PCT Filed: Nov. 29, 2019

(86) PCT No.: PCT/SG2019/050589
§ 371 (c)(1),
(2) Date: Dec. 22, 2022

(87) PCT Pub. No.: WO2020/112028
PCT Pub. Date: Jun. 4, 2020

(65) Prior Publication Data

US 2023/0295383 A1 Sep. 21, 2023

(30) Foreign Application Priority Data

Nov. 30, 2018 (SG) ........................... 10201810735X

(51) Int. Cl.
*C08J 3/24* (2006.01)
*B08B 3/10* (2006.01)
*C08J 3/09* (2006.01)

(52) U.S. Cl.
CPC ................. *C08J 3/24* (2013.01); *B08B 3/102* (2013.01); *C08J 3/09* (2013.01); *C08J 2300/102* (2013.01)

(58) Field of Classification Search
CPC ........... C08J 2300/102; C08J 3/09; C08J 3/24
See application file for complete search history.

(56) References Cited

U.S. PATENT DOCUMENTS 5,271,631 A * 12/1993 Yokouchi ................. F16J 15/43
277/410
6,413,667 B1 7/2002 Gozdz
(Continued)

FOREIGN PATENT DOCUMENTS

CA 1210806 A 9/1986
CN 1419718 A 5/2003
(Continued)

OTHER PUBLICATIONS

CN102298933A Machine Translation (Year: 2011).*
(Continued)

*Primary Examiner* — Kelly M Gambetta
(74) *Attorney, Agent, or Firm* — Hall Estill Law Firm

(57) ABSTRACT

Disclosed herein a workpiece, a workpiece processing method and a workpiece processing system. To achieve hermetic sealing in a workpiece, it is often desirable to remove contaminants from channels and to seal up the channels. The workpiece processing method comprising applying a low surface energy solution on a surface of the workpiece, the low surface energy solution includes a carrier solvent and a filler material dissolved in the carrier solvent; allowing the low surface energy solution to impregnate into a channel in the workpiece; removing the solvent from the low surface energy solution to remain the filler material in the channel to hermetically seal the channel.

8 Claims, 8 Drawing Sheets

(56) References Cited

U.S. PATENT DOCUMENTS

| | | | | |
|---|---|---|---|---|
| 8,094,408 | B2 | 1/2012 | Uefune et al. | |
| 2008/0031096 | A1* | 2/2008 | Rimlinger | G06F 11/1433 714/E11.135 |
| 2008/0068745 | A1* | 3/2008 | Uefune | G11B 33/148 |
| 2009/0176953 | A1 | 7/2009 | Morikawa et al. | |
| 2016/0243545 | A1* | 8/2016 | Sambasivan | C12Q 1/04 |
| 2017/0053679 | A1 | 2/2017 | Albrecht et al. | |
| 2017/0221527 | A1* | 8/2017 | Choe | G11B 33/022 |
| 2017/0294737 | A1* | 10/2017 | Horchler | H01R 13/5216 |
| 2018/0078981 | A1 | 3/2018 | Kawagoe et al. | |

FOREIGN PATENT DOCUMENTS

| | | | | | |
|---|---|---|---|---|---|
| CN | 101154430 | | | 10/2011 | |
| CN | 101154430 | B | | 10/2011 | |
| CN | 102298933 | A | * | 12/2011 | G11B 25/043 |
| CN | 106811114 | A | * | 6/2017 | C09D 183/08 |
| CN | 107427871 | A | | 12/2017 | |
| EP | 0730017 | A1 | | 9/1996 | |
| GB | 950938 | A | | 2/1964 | |
| JP | 61-39953 | S | | 2/1986 | |
| JP | S6139953 | | | 2/1986 | |
| JP | S6139953 | A | * | 2/1986 | |
| JP | 2016089264 | A | | 5/2016 | |

OTHER PUBLICATIONS

CN2019800789441; First Office Action; Aug. 15, 2022; 2 pages.
CN2019800789441; Second Office Action; Mar. 13, 2023; 3 pages.
WO2020112028; International Search Report and Written Opinion; Feb. 19, 2020; 11 pages.

* cited by examiner

WORKPIECE, A WORKPIECE PROCESSING METHOD AND A WORKPIECE PROCESSING SYSTEM THEREOF

RELATED APPLICATIONS

This is a national stage application of a PCT application having International Application No. PCT/SG2019/050589, filed Nov. 29, 2019, which claims priority to Singapore Provisional Application having SG Serial No. 10201810735X, filed on Nov. 30, 2018, the disclosures of which are hereby expressly incorporated herein by reference.

TECHNICAL FIELD

Disclosed herein relates to the field of workpiece processing, in particular a method of processing a surface of a casting or porous workpiece and a system thereof.

BACKGROUND

A hard disk drive comprises several pieces of magnetic storage disks and recording head with read/write sensors that are capable of reading data from and writing data onto the rotating storage disks. Data is typically stored in concentric tracks on the disk. The read/write sensors are formed on a slider via typical semiconductor process including wet/dry etching, photolithography and sputtering. The hard disk drive is assembled with stainless steel suspensions as a part of an actuator assembly positioning the heads over hard disk media and predetermined height for certain recording density requirement. Occasionally, the recording head may in contact with the surface of the storage disk that caused by surface asperities, flying attitude, disk rotating speed or airflow within hard disk drive.

Air turbulence created by the spinning disks, disk flutter and spindle vibrations, temperature and altitude can all adversely affect registration of the read/write element relative to the tracks which become more and more narrow for greater recording density. Higher rotational speeds can also increase disk flutter and spindle vibrations further increasing track misregistration or TMR. Reducing the distance between the magnetic transducer and the recording medium is one of the key approaches to get greater recording density. Closer positioning of the slider permits tracks to be written more narrowly and reduces errors when writing data to the tracks. However, since the disk rotates over 10 thousand RPM, continuous direct contact between the slider and the recording medium will cause unacceptable wear on both slider and recording media surfaces. It can result in the loss of data, damage read/write sensors or scratch the disk surfaces.

Therefore, cleanliness within hard disk drive is critical. Hard disk drives are assembled in a cleanroom to reduce contamination from entering the drive prior to final assembly. Thus, the air that is trapped within the drive once it is finally sealed is filtered room air. Accordingly, seals used in disk drives between the housing components, such as the baseplate and topcover, are designed to prevent contaminants from entering the drive. Such seals are not designed to prevent internal air and other gases from exiting through the seal and out of the drive. Loss of gas in this manner is anticipated and accommodated by use of a filtered port to maintain equalized air pressure within the drive compared to that of air pressure outside of the drive.

In order to have a lower density than air within hard disk drives to enhance drive performance, filling helium gas which has lower density than air at similar pressures and temperatures is used. A lower density gas can reduce aerodynamic drag experienced by spinning disks within the drive, thereby reducing power requirements for the spindle motor. At the same time, the reduction in drag forces within the low density gas-filled drive reduces the amount of aerodynamic turbulence that is experienced by drive components such as the actuator arms, suspensions and read/write heads. It then allows spindle motor rotating at higher speeds compared with air-filled drives, while maintaining the same flying height and thereby maintaining the same range of read/write errors. It also allows for higher data storage capacities through higher recording densities due to less turbulence within the drive. However, difficulties are encountered to hermetically seal the hard disk drives due to presence of porosities in the casting parts, baseplate for example.

SUMMARY

Disclosed herein a workpiece, a workpiece processing method and a workpiece processing system.

According to an embodiment, a workpiece processing method comprising applying a low surface energy solution on a surface of the workpiece, the low surface energy solution includes a carrier solvent and a filler material dissolved in the carrier solvent; allowing the low surface energy solution to impregnate into a channel in the workpiece; removing the solvent from the low surface energy solution to remain the filler material in the channel to hermetically seal the channel.

In an embodiment, the filler material is a polymer selected from at least one of a fluorinated resin, fluorinated silane, fluorinated acrylate and a fluorinated monomer. Further, the polymer material is free from water-based resin.

In another embodiment, the method further comprising cleaning the workpiece prior to applying a low surface energy solution on the surface of the workpiece. Optionally, cleaning the workpiece includes immersing the workpiece into a first cleaning solvent in liquid form wherein the first cleaning solvent is under ultrasonic agitation. Cleaning the workpiece may include vapor rinsing the workpiece by condensing the first cleaning solvent in vapor form on the surface of the workpiece and further includes drying the workpiece.

Additionally, applying the low surface energy solution on the workpiece includes immersing the workpiece into the low surface energy solution. The low surface energy solution may be at room temperature, under atmospheric pressure and/or under ultrasonic agitation. The workpiece may be withdrawn from the low surface energy solution under a controlled speed. Optionally, the workpiece is tilted relative to a vertical direction when immersed in the low surface energy solution.

The method further comprising removing a low surface energy coating formed on the surface of the workpiece. Removing the low surface energy solution from the surface of the workpiece may include vapor rinsing the workpiece by condensing a second cleaning solvent in vapor form on the surface of the workpiece, wherein the second cleaning solvent flows on the surface of the workpiece via gravity.

Removing the carrier solvent from the low surface energy solution in the channel includes evaporating the carrier solvent. Further, removing the carrier solvent from the low surface energy solution in the channel includes curing the workpiece under a temperature in the range of room temperature to 270° C. Alternatively, the workpiece is cured under UV treatment. The method may further include cleaning the workpiece after curing. The workpiece may be a metallic casting part.

In another embodiment, a workpiece processing system is disclosed. The workpiece processing system comprises an application tank for containing a low surface energy solution, the low surface energy solution includes a carrier solvent and a filler material dissolved in the carrier solvent; a transporter movable relative to the application tank; wherein the system is configured to perform the steps of applying the low surface energy solution on a surface of the workpiece; allowing the low surface energy solution to impregnate into a channel of the workpiece; removing the carrier solvent from the low surface energy solution to remain the filler material in the channel to hermetically seal the channel.

The application tank may further comprise cooling coils disposed at an opening of the application tank configured to condense the carrier solvent in vapor form, preventing the carrier solvent in vapor form from escaping the application tank. Optionally, the application tank further comprises ultrasonic generator disposed in the application tank for agitating in the low surface energy solution. A vacuum system may be coupled to the system to reduce the pressure in the system for applying the low surface energy solution on the surface of the workpiece. Additionally, the system may further comprise a treatment tank containing a cleaning solvent for cleaning the workpiece and a recycle tank in fluid communication with the system, the recycle tank being configured to receive the carrier solvent or the cleaning solvent in vapor form for condensing and reusing. Optionally, the recycle tank may be in fluid communication with the treatment tank or alternative in fluid communication with the application tank.

The system may further comprise ultrasonic generator disposed in the treatment tank for agitating the first solvent solution during cleaning. Cooling coils may be disposed at an opening of the treatment tank configured to condense the cleaning solvent in vapor form, preventing the cleaning solvent in vapor form from escaping from the application tank. A density meter may be provided in fluid communication with the application tank for measuring a concentration of filler material in the low surface energy solution.

An embodiment of a workpiece such as a metallic casting part is also disclosed. The workpiece includes a main body having a first surface and a second surface opposite to the first surface; a channel connecting the first surface and the second surface; a filler material bonded in and hermetically seals the channel. The filler material may be a polymer selected from at least one of a fluorinated resin, fluorinated silane, fluorinated acrylate and a fluorinated monomers. Further, the polymer material may be free from water based resin. The first surface of the workpiece may further comprise a first surface region coated by an Electrophoretic Painting (E-Coating), and a second surface region adjacent to the first surface region, wherein the second surface region is free from Electrophoretic Painting (E-Coating).

The above and other features and advantages of the invention will be described below with reference to exemplary embodiments as illustrated in the accompanying drawings.

DETAILED DESCRIPTION

A workpiece processing system and a workpiece processing method is disclosed. A workpiece such as a casting material is commonly used in various engineering applications. After the casting process, contaminants such as hydro carbon, xylene, etc are often left on the workpiece surface and within channels of the workpiece. Channels, crevices, gaps, craters, pits, voids, cracks, dislocations, etc. are collectively known herein as channels in the workpiece or permeability of the workpiece. Additionally, channels in a workpiece often undermines mechanical integrity, hermetic sealing ability, electrical resistivity/conductivity, thermal properties, etc. As an example, to achieve hermetic sealing in a casting material, it is often desirable to remove contaminants from the channels and seal up the channels with a sealant or a coat to reduce the permeability of the casting material. Due to the small size of the channels (micron size), there is difficulty for conventional sealant or coating to penetrate the channels and to effectively seal the channels.

Figure 1:
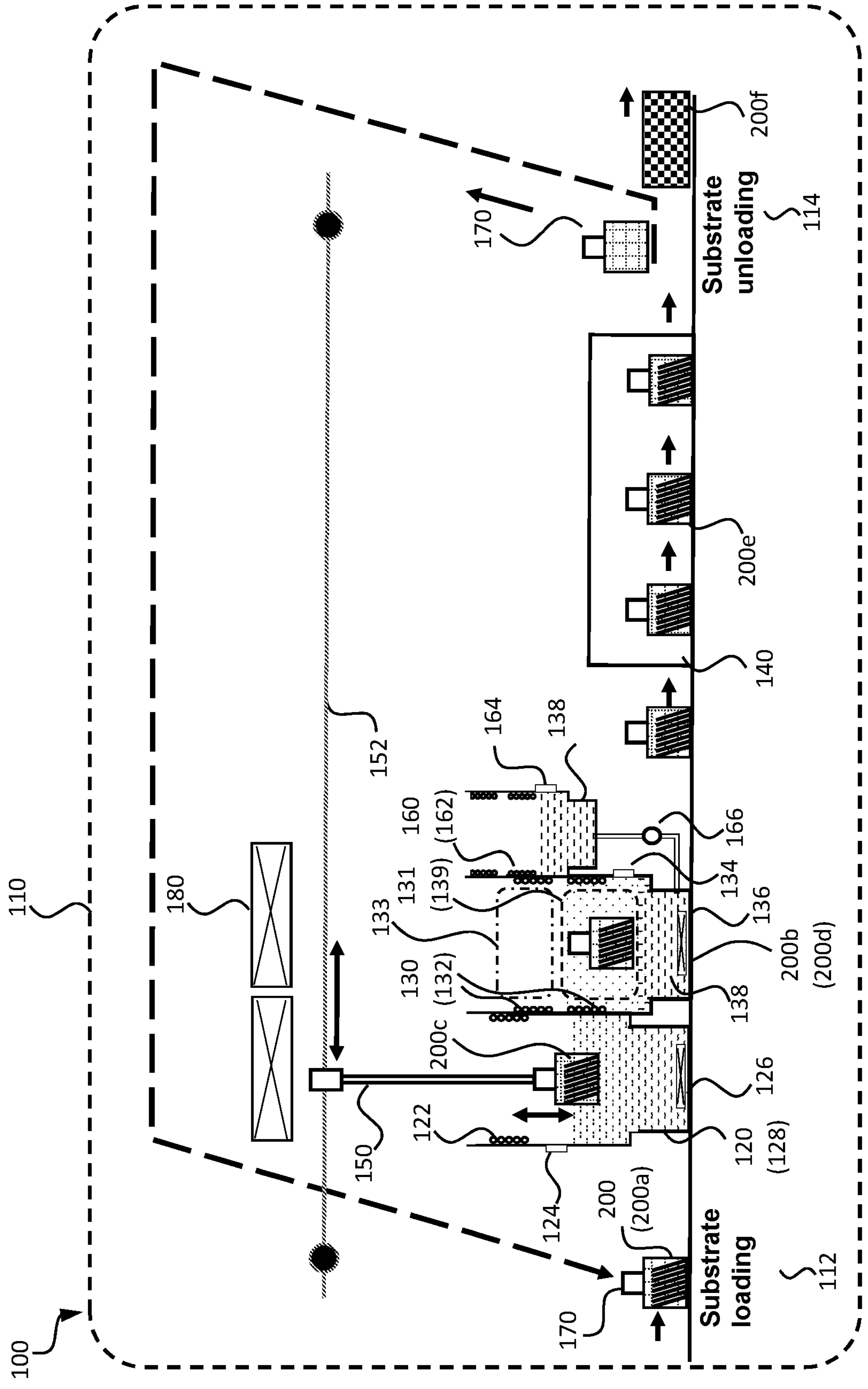
FIG. 1 is a schematic view of a workpiece processing system according to an embodiment.

FIG. 1 illustrates a workpiece processing system for processing a workpieces 200, such as a metallic workpiece 200. The workpiece processing system comprises an enclosure 110 within which disposes an application tank 120, a treatment tank 130, a curing enclosure 140, a transporter such as a robotic arm 150, a recycle tank 160 fluidly coupled to the treatment tank 130 and an air filtration system 180 such as a HEPA filter system. A basket 170 moveable by the robotic arm 150 is provided for holding and supporting one or more workpieces 200 within the enclosure 110. The enclosure 110 may be provided with a workpiece loading point 112 and a workpiece unloading point 114, such that workpieces may be loaded for processing and be removed after processing.

As shown in FIG. 1, the application tank 120 is configured to contain a fluid such as a low surface energy solution 128, and the application tank 120 is provided with fluid sensors 124 for detecting the fluid level of the low surface energy solution 128. The application tank 120 is configured for applying the low surface energy solution 128 onto the workpieces 200. The application tank 120 defines an opening configured for allowing the basket 170 and respective workpieces 200 disposed in the basket 170 to be lowered into an interior of the application tank 120. Optionally, one or more cooling coils 122 are disposed periphery of the opening of the application tank 120 for cooling the region just above the fluid level in preventing low surface energy solution 128 vapor from escaping from the application tank 120. An ultrasonic generator 126 is disposed at a base of the application tank 120 for agitating the low surface energy solution 128. Additionally, a storage tank may be in fluid communication with the application tank 120 for storing and supplying the application tank 120 with fresh low surface energy solution 128.

Similarly, the treatment tank 130 is also configured to contain a fluid such as a solvent 138, and the treatment tank 130 is also provided with fluid sensors 134 for detecting the fluid level of the solvent 138. The treatment tank 130 is configured for pre-treating of the workpiece prior to applying of the low surface energy solution 128 on the workpiece 200 and also for post-treating of the workpiece 200 after applying of the low surface energy solution 128 on the workpiece 200. Further, a boiling tank may be in fluid communication with the treatment tank 130 for supplying the treatment tank with a solvent vapor 139. Alternatively, a heating element may be present in the treatment tank to boil the solvent 138 in the treatment tank in producing the solvent vapor 139. The treatment tank 130 also defines an opening configured for allowing the basket 170 and respective workpieces 200 to be lowered into an interior of the treatment tank 130. One or more cooling coils 132 are disposed periphery of the opening of the treatment tank 130 in the region just above the fluid level in preventing solvent vapor 139 from escaping from the treatment tank 130. An ultrasonic generator 136 is disposed at a base of the treatment tank 130 for agitating the solvent 138 for more effective pre-treating of the workpiece 200. Additionally, a storage tank may be in fluid communication with the treatment tank 130 for storing and supplying the treatment tank 130 with fresh solvent.

The curing enclosure 140 performs the curing the workpiece 200. The curing enclosure 140 may be provided with a high temperature environment, an UV environment, a combination thereof or any other suitable environment for curing. The robotic arm 150 is configured to move along a rail 152 and to hold onto and release upon the basket 170 and respective workpieces 200 within the enclosure 110 at different positions during the process.

In an embodiment, the recycle tank 160 is provided in fluid communication with the treatment tank 130 for receiving the solvent vapor 139 from the treatment tank 130 after pre-treating or post-treating of the workpiece 200. One or more cooling coils 162 are disposed periphery of the opening of the recycle tank 160 for cooling and condensing a fluid vapor, preventing the fluid vapor from escaping from the tank. The solvent vapor 139 is then condensed in the recycle tank 160 for reuse. A filter 166 may be provided between the recycle tank 160 and the treatment tank 130 such that the solvent vapor 139 is filtered for contaminants. Additionally, the recycle tank 160 is provided with a water-solvent separator such that any water vapor in mixture with the solvent vapor 139 may be removed in ensuring purity of the solvent 138 for reuse. Alternatively or additionally, the recycle tank 160 may be provided in fluid communication with the application tank 120 for receiving low surface energy solution 128 from the application tank 120, and distilling the low surface energy solution 128 for reusing. A filter is similarly provided between the application tank 120 and the recycle tank 160 for removal of contaminants. In yet another alternative, both treatment tank 130 and application tank 120 are connected to respective recycle tanks.

Figure 2A:
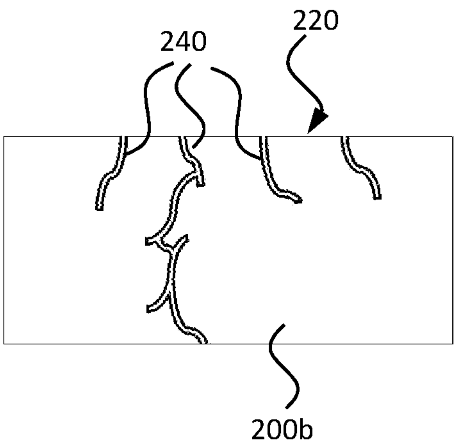
FIG. 2A to 2D are schematic diagrams of a workpiece at each processing step, according to the embodiment of FIG. 1.

Referring again to FIGS. 1 to 4, the workpiece processing process is as described accordingly. At the workpiece loading point 112, the basket 170 is loaded with fresh unprocessed workpieces 200*a*. The robotic arm 150 is configured to pick up and move the basket 170 from the workpiece loading point 112 to the treatment tank 130 for pre-treatment. The pre-treatment may be performed in room temperature and atmospheric pressure. At this moment, the treatment tank 130 is filled with a first cleaning solvent 138 and the robotic arm 150 immerses the basket 170 with the workpieces 220*a* into the first cleaning solvent 138 for cleaning. With the optional use of the ultrasonic generator 136 with frequency of vibration between 10 KHz to 1000 KHz, contaminants such as hydrocarbon residual, xylene, lubricant, etc. are removed from a surface 220 of the workpiece 200*a* and from within channels 240 of the workpiece 200*a*, as shown in FIG. 2A resulting in a pre-treated workpiece 200*b*. Alternatively, the basket 170 with the workpieces 220*a* may be first lowered into the treatment tank 130 before a first cleaning solvent 138 is supplied into the treatment tank from either the storage tank or the recycle tank. A vacuum may be connected to the treatment tank 130 in producing a pressure differential between the treatment tank 130 and the storage or recycle tank.

A further step is provided to move the pre-treated workpiece 200*b* into a vapor zone 131 just above the solvent fluid level and adjacent to the cooling coils 132 by use of the robotic arm 150. A cleaning solvent vapor 139 may be provided to the vapor zone 131 to further cleanse the workpiece 200*b*. As the cleaning solvent vapor 139 is at a temperature higher than the temperature of the workpiece 200*b*, the cleaning solvent vapor 139 condenses and cleanse the workpiece 200*b* by means of vapor rinsing. Advantage of vapor rinsing is the prevention of particle re-deposition wherein workpiece immersed in liquid solvent has residual contaminants when removed from the liquid solvent. This is due to contaminants which were previously removed from the workpiece are redeposited on the workpiece by way of residual solvent left on the workpiece surface which are not free from contaminants.

As an example, the cleaning solvent vapor 139 may be generated by heating the cleaning solvent 138 at a slightly increased pressure to its boiling point in the boiling tank, thus resulting in a small pressure differential between the boiling tank and the treatment tank 130 causing the cleaning solvent vapor 139 to be pushed to the vapor zone 131. Alternatively, the cleaning solvent 138 in the treatment tank 130 may be heated directly to form cleaning solvent vapor 139 which raises up to the vapor zone 131. The cleaning solvent 138/cleaning solvent vapor 139 may be a low surface energy solvent, such that the solvent may overcome the surface energy of the pore surfaces and move into the channels 240 for effective cleaning. As another example, the cleaning solvent 138/cleaning solvent vapor 139 may be a market available fluorinated solvent, which are non-flammable and safe to use.

The workpiece 200*b* is then moved to the drying zone 133 adjacent to cooling coil 132 for drying. Another purpose of the drying zone is to prevent the cleaning solvent vapor 139 from escaping from the treatment tank 130. With the cooling coil 132 cooling the cleaning solvent vapor 139 to below the solvent boiling point, the cleaning solvent vapor 139 is condensed back into liquid form and returning to the treatment tank 130 as liquid cleaning solvent 138. Typically, the workpiece 200*b* is immersed in the treatment tank 130 for about 1-10 min, followed by a 1-3 min drying in the vapor zone 131.

Figure 2B:
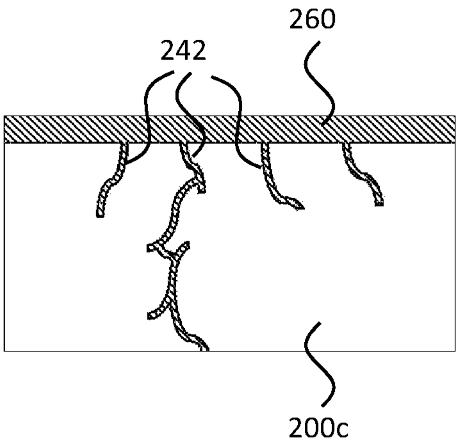

The pre-treated workpieces 200*b* are then picked up and moved to the application tank 120 by the robotic arm 150 for applying of low surface energy solution. The application tank 120 may be at room temperature and atmospheric pressure. At this moment, the application tank 120 is filled with low surface energy solution 128 which is a mixture of polymer and carrier solvent and the robotic arm 150 immerses the basket 170 with the pre-treated workpieces 200*b* into the low surface energy solution 128. With the optional use of the ultrasonic generator 126, the low surface energy solution 128 is applied or coated onto a surface 220 of the workpiece 200*b*. The low surface energy solution 128 is then allowed to impregnate into a plurality of channels 240 of the workpiece 200*b* as shown in FIG. 2B. This resulting in the workpiece 200*c* of which surface 220 and channels 240 are coated or filled with the lower surface energy solution giving a surface coat 260 and coated channels 242. With the optional use of the ultrasonic generator 126, applying of the low surface energy solution 128 is made more effective. Alternatively, the basket 170 with the workpieces 220*b* may be first lowered into the application tank 120 before the lower surface energy solution is supplied into the application tank 120 from either the storage tank or the recycle tank. A vacuum system may be connected to the application tank 120 in producing a pressure differential between the application tank 120 and the storage or recycle tank.

The low surface energy solution 128 overcomes the small size of the channels 240, and is able to penetrate or impregnate the channels 240 for effective sealing. Surface energy describes the strength/molecular force of attraction between unlike materials, such as between a solution and a workpiece. The low surface energy solution 128 may include a carrier solvent, such as a low surface energy solvent, and a filler material, such as a polymer material dissolved in the carrier solvent. The polymer material may include a fluorinated resin, fluorinated monomer, fluorinated acrylate, fluorinated silane, etc. The polymer material does not include a water based resin. Typical surface energy of the low surface energy solution is in the range of 11 to 30 dynes/cm Sufficient dwell time (for example 1-10 mins) allows for the low surface energy solution 128 to overcome the surface energy of the channel 240 surfaces and move into the channels 240 and to be bonded to the channel surfaces resulting in coated channels 242. Additionally, the use of the vacuum system aids in the penetration of polymer material into the channels 240 of the workpiece 200*c*.

Figure 3:
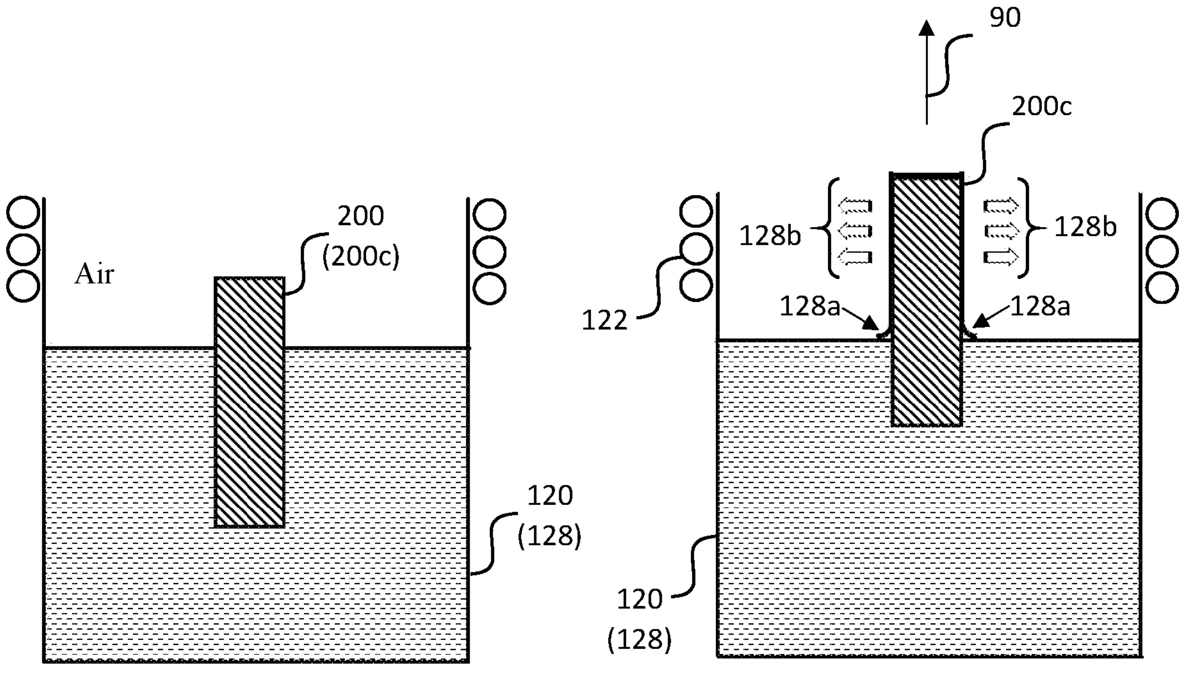
FIG. 3 is a schematic view of the workpiece immersing and withdrawing from the application tank, according to the embodiment of FIG. 1.

Referring to FIG. 3, the workpieces 200*c* are then withdrawn from the low surface energy solution 128 at a controlled withdrawal speed 90. When the workpieces 200*c* are withdrawn from the low surface energy solution 128, an amount of low surface energy solution 128*a* flows along the workpiece 200*c* and return to the application tank 120. Concurrently, then the workpieces 200*c* are withdrawn from the low surface energy solution 128, a portion of the carrier solvent 128*b* is allowed to evaporate from the coated channel 242 and the coated surface 260, leaving the filler material to remain on the surface of the workpiece 200*c* and to be retained in the coated channel 242 as shown in FIG. 2B. Alternatively, there may be residual carrier solvent 128*b* remaining in the coated channel 242 and the coated surface 260 and is removed in later steps, such as during curing.

Additionally, the carrier solvent vapor 128*b* is prevented from escaping from the application tank 120 due to the use of the cooling coil 122. Further, the cooling coil 122 is used in reducing vaporization of the carrier solvent 128*b*.

Figure 4:
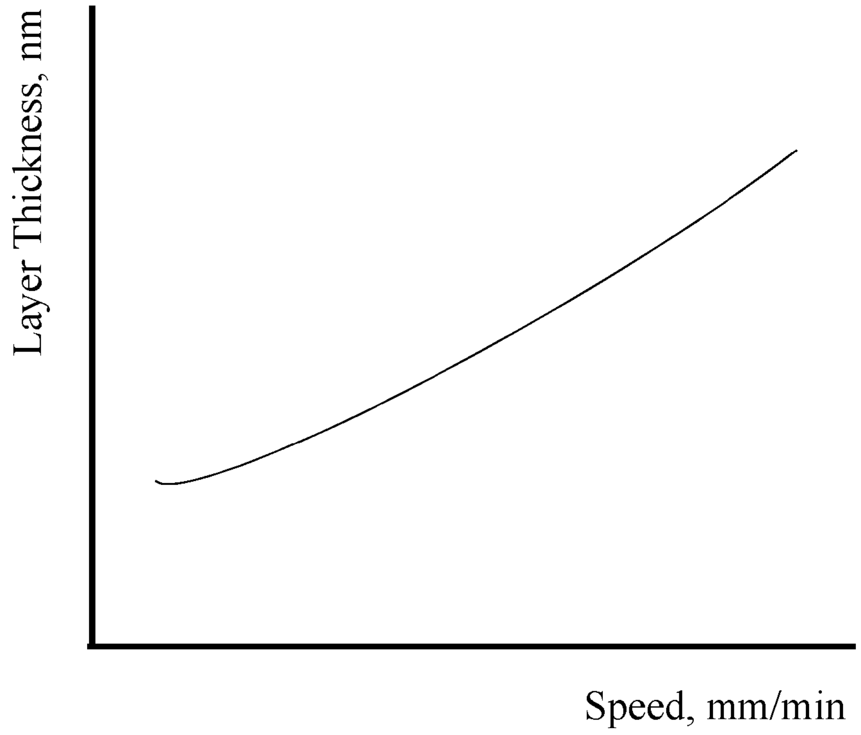
FIG. 4 is a graph illustrating the relationship between layer thickness and withdrawal speed according to the embodiment of FIG. 1.

The controlled withdrawal speed determines the layer thickness or amount of the low surface energy solution 128 or the filler material applied on the coated surfaces 260 and in the coated channels 242 of the workpiece 200*c*. FIG. 4 illustrates an exemplary relationship between the withdrawal speed and the layer thickness. Concentration of the filler material in the low surface energy solution 128 is another factor for controlling of the layer thickness.

Figure 2C:
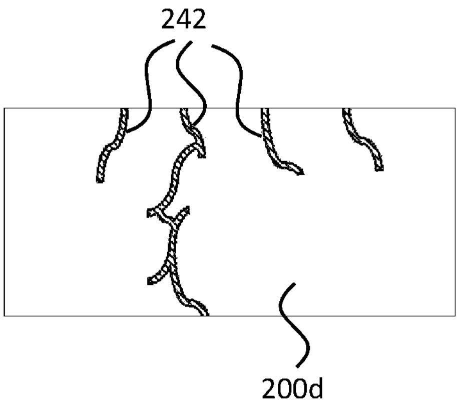

The coated workpieces 200*c* are then picked up and moved again to the treatment tank 130 by the robotic arm 150 for post-treatment at room temperature and atmospheric pressure. Alternatively, the coated workpieces 200*c* may be moved to a second treatment tank similar in function and structure as treatment tank 130. The workpieces 200*c* are moved into the vapor zone 131 just above the solvent fluid level and is adjacent to the cooling coils 132. A second cleaning solvent vapor is provided to the vapor zone 131 for vapor rinsing which typically takes about 10-120 seconds. As an example, the second cleaning solvent vapor may be the same as the first cleaning solvent vapor 139. The second cleaning solvent vapor is provided from the boiled tank at an increased pressure, or alternatively is generated from boiling the solvent 138 in the treatment tank 130. When the second cleaning solvent vapor is in contact with the workpieces 200*c*, the second cleaning solvent vapor condenses on the coated surface 260 of the workpiece 200*c*, flowing on the coated surface 260. The filler material may be dissolved by the condensed second cleaning solvent and the filler material are removed from the coated surface 260 together with other unwanted residues occurred. In an embodiment, the workpiece 200*c* may be orientated in a vertical orientation or tilted relative to the vertical direction by an angle (for example, between 1-60° from the vertical) such that the second cleaning solvent flows along the coated surface 260 of the workpieces 200*c* via gravity. While the coat of filler material is removed from the coated surface 260, the filler material in the channels 242 remain resulting in a post-treated workpiece 200*d* as shown in FIG. 2C, which is clean and neat. Alternatively, the coated workpieces 200*c* may be instead moved a second treatment tank by the robotic arm 150 for post-treatment.

Figure 2D:
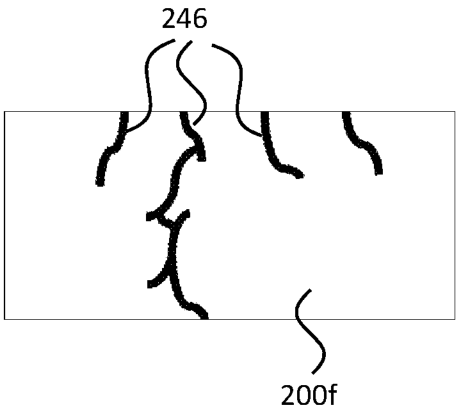

Following the vapor rinsing, the post-treated workpieces 200*d* are picked up and moved by the robotic arm 150 to the curing enclosure 140 for curing. Depending on the low surface energy solution property/polymer material, differing curing temperature or curing methods may be used to form cross link and chemically bond the low surface energy solution/polymer material to the cured channels 246 to produce the processed workpiece 200*f* as shown in FIG. 2D. For example, a typical curing temperature is from room temperature to 270° C. for a duration of 10-120 mins depending on the polymer material properties. Alternatively, Ultraviolet (UV) curing may be performed to cross link and bond the filler material. A good cleaning of the pore surfaces results in effective bonding between the filler material and the channels 246.

After curing, the processed workpiece 200*f* may undergo another round of vapor rinsing and drying in the treatment tank 130 in removing all residual contaminants on the processed workpiece 200*f* due to curing and previous processing steps. Thereafter, the processed workpiece 200*f* are then cooled down under room temperature or cooled down in an environment with cold air flowing prior to be moved to the workpiece unloading point 214. The workpieces 200*f* are unloaded from the basket 170, and the empty basket 170 is then returned to the workpiece loading point 212.

With reference to FIG. 2D, in an embodiment of a workpiece 200, the workpiece 200 comprises a main body having a first surface 220*a* and a second surface 220*b* opposite to the first surface 220*a*, a channel 246 connecting the first surface 220*a* and the second surface 220*b*, a filler material bonded in and hermetically seals the channel 246. The filler material may be a polymer material. The polymer material may be a polymer selected from at least one of a fluorinated resin, fluorinated silane and a fluorinated monomers. The polymer material also may be a fluorinated acrylate. The carrier material may be free from water-based resin. The workpiece may be a metallic casting part.

In an embodiment, a low surface energy solution 128 comprising a filler material, and a carrier solvent which may be different solvent or the same as the first/second cleaning solvent 138 used in the treatment tank 130. A density meter may be disposed in fluid communication with the application tank 120 to measure a concentration of filler material in the low surface energy solution. After certain duration of duty cycle, due to the depletion of filler material, the low surface energy solution 128 must be replaced or refreshed completely. In the process, the used low surface energy solution 128 is transferred to recycle tank 160 for distilling in which the low surface energy solution 128 is heated up to boiling temperature for distillation into solvent. After the transfer, fresh low surface energy solution are used to flush the application tank to ensure the cleanliness of application tank. The flushing solution is similarly transferred to the recycle tank for distillation. The distilled solvent may then be transferred into the treatment tank for reusing. Reuse of the solvent will contribute a big saving for customer for using solvent cleaning and solvent treatment. After distillation, the filler material residual may be used for making other coating product such as for making hydrophobic surfaces which has a lower requirement for contamination. Ideally, the ecosystem may not discharge any waste chemical or exhaust gases and may possibly provide a low cost solvent cleaning in addition to zero water consumption.

Example—Hard Disk Drive

Hard disk base plates or other hard disk drive components are typically manufactured from using die casting process or similar processes. Such processes often result in the hard disk base plate having a channels at the surface and also channels within the bulk material of the base plate. Permeability within the base plate or other hard disk drive components may allow gases, such as low-density gas (for example helium gas) to permeate through the walls of the base plate or components. To achieve hermetic sealing, the hard disk base plates are treated with a coating sealant that is intended to reduce the permeability of the hard disk base plates, thereby reducing the amount of gas escaping from the disk drive enclosure.

Impregnation process is typically used for sealing or blocking the porosities in die casting components. Before and after the sealant move to substantially penetrate channels and crevasses of the castings, the sealant is frequently transferred between the autoclave and storage tank at a relatively high velocity driven by the pressure difference between autoclave and storage tank. It again results in foaming or bubbles of the sealant due to turbulent flow. Due to this problem during the impregnation cycle, the gas bubbles may also be trapped. Either remains in a casting component pore or crevasse or block the pore for sealant filling, an unsealed surface void remains which may ultimately lead to leakage of gas from the disk drive. It will therefore significantly reduce the warranted life and lost all advantages of low density gas filled hard disk drive. Although the bubbles can be removed from the sealant, but this "de-gassing" process is time consuming and decreases the efficiency of the overall disk drive manufacturing process.

Currently, the hard disk drives are using perpendicular media recording. Helium filled drive has showed big advantages in energy saving, increasing of recording density, reducing of acoustic noise for magnetic hard disk drive recording. Heat assist magnetic recording (HAMR) will be the next generation magnetic recording technology with extremely high areal recording density and scheduled to be launch in 2020. Combination of HAMR technology and helium filled hard disk drive technology is believed the trend for future hard disk drive industry. Helium gas leaking prevention will be critical for current and future hard disk drive product. In addition, HAMR technical will need much higher cleanliness inside the drive. That means the cleanliness requirements for every components of hard disk drive will be put to a much higher level. Hydrocarbon and other organic contaminations must be reduced as close to zero as possible to ensure the reliability of hard disk drive.

It is advantageous to employ the use of the workpiece processing method using a low surface energy solution and the workpiece processing system as described above in contrast to conventional impregnation technology using high surface energy sealant with a vacuum and high pressure system. Comparing the method and system disclosed herein, conventional impregnation technology has below disadvantages: 1) customer has to discharge waste sealant materials, 2) high water consumption, 3) waste chemical treatment, 4) mandatory to use high pressure for sealant penetration, 5) much longer operation time, 6) mandatory to use vacuum pump to enhance sealant molecules penetration, 7) lower yield because of bubbles or particles generated during sealant transferring, 8) high cost, etc.

Figure 5:
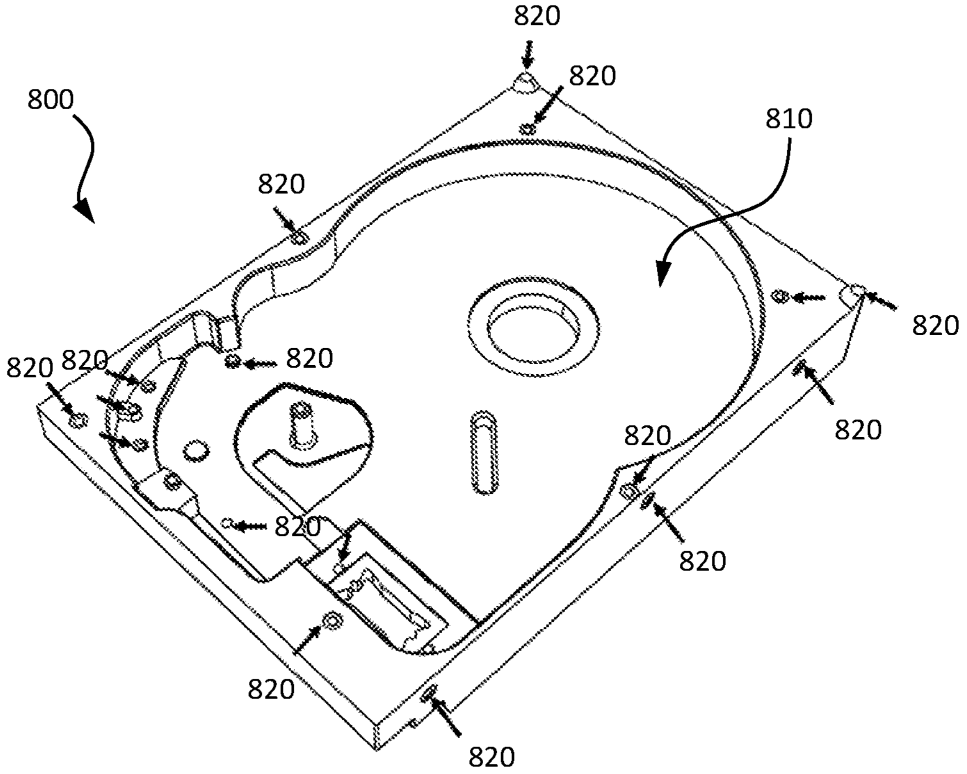
FIG. 5 is a perspective view of a hard disk drive base plate.
Figure 6:
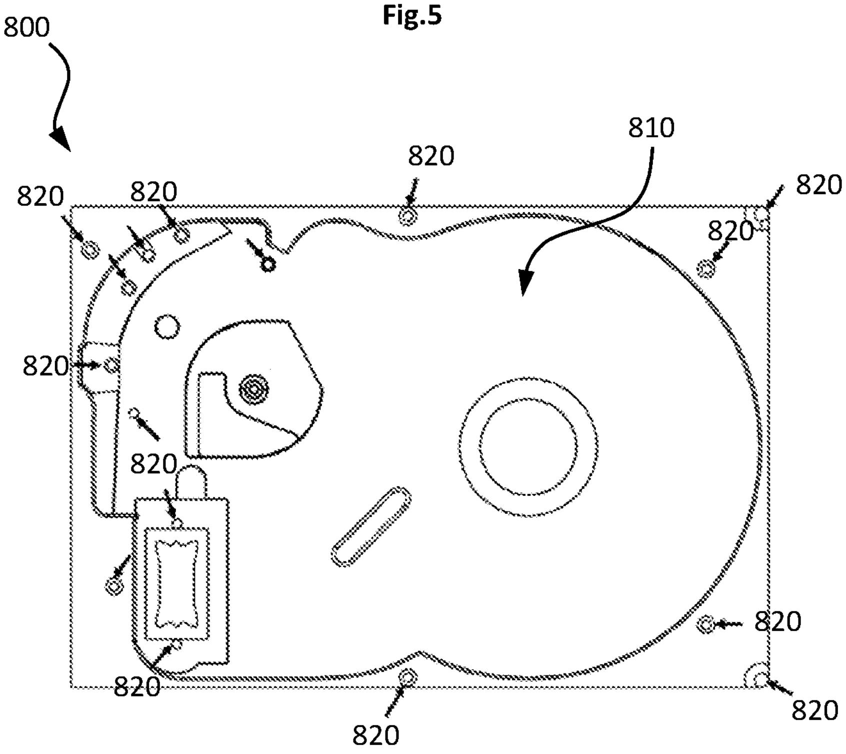
FIG. 6 is a top view of the hard disk drive base plate according to FIG. 5.
Figure 7:
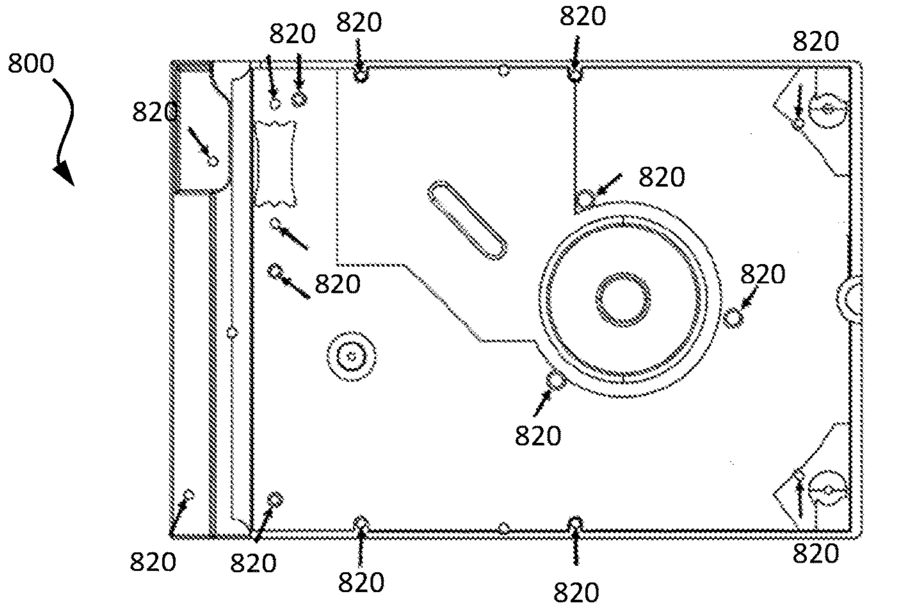
FIG. 7 is a bottom view of the hard disk drive base plate according to FIG. 5.

In an example as illustrated in FIGS. 5 to 7, a typical hard disk base plate with an Electrophoretic Painting (E-Coating) is shown. While the E-Coating act as a barrier to block the channels in the hard disk base plate, due to the need for grounding for such electronic components, the coating on the surrounding area of screw holes 820 is required to be removed mechanically, resulting in channels in the surrounding area of the screw holes to be exposed. When the channels on the inner surface are in fluid communication with channels in the outer surface, the prefilled helium gas may leak from the hard disk.

Figure 8:
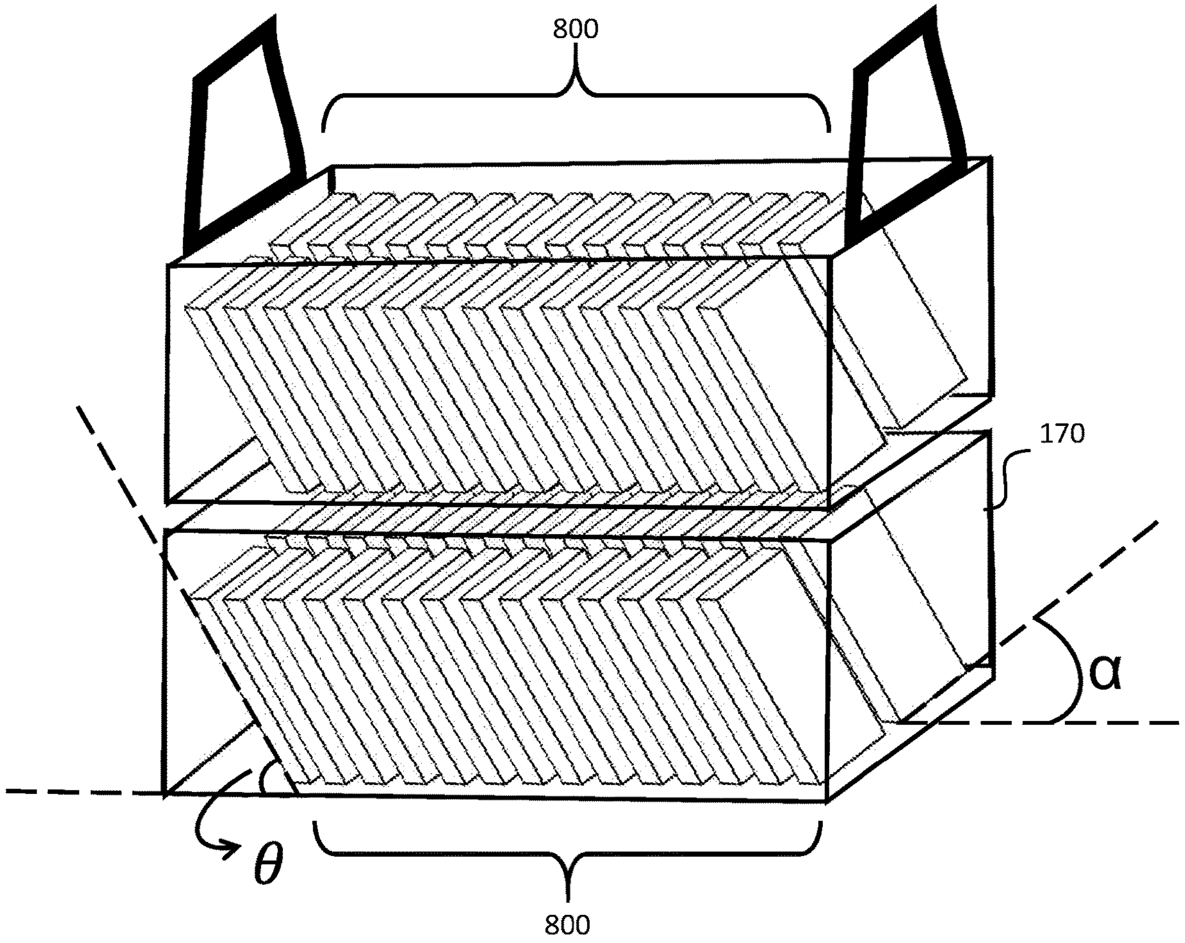
FIG. 8 is a perspective view of a basket and hard disk drive base plates according to an embodiment.
Figure 9:
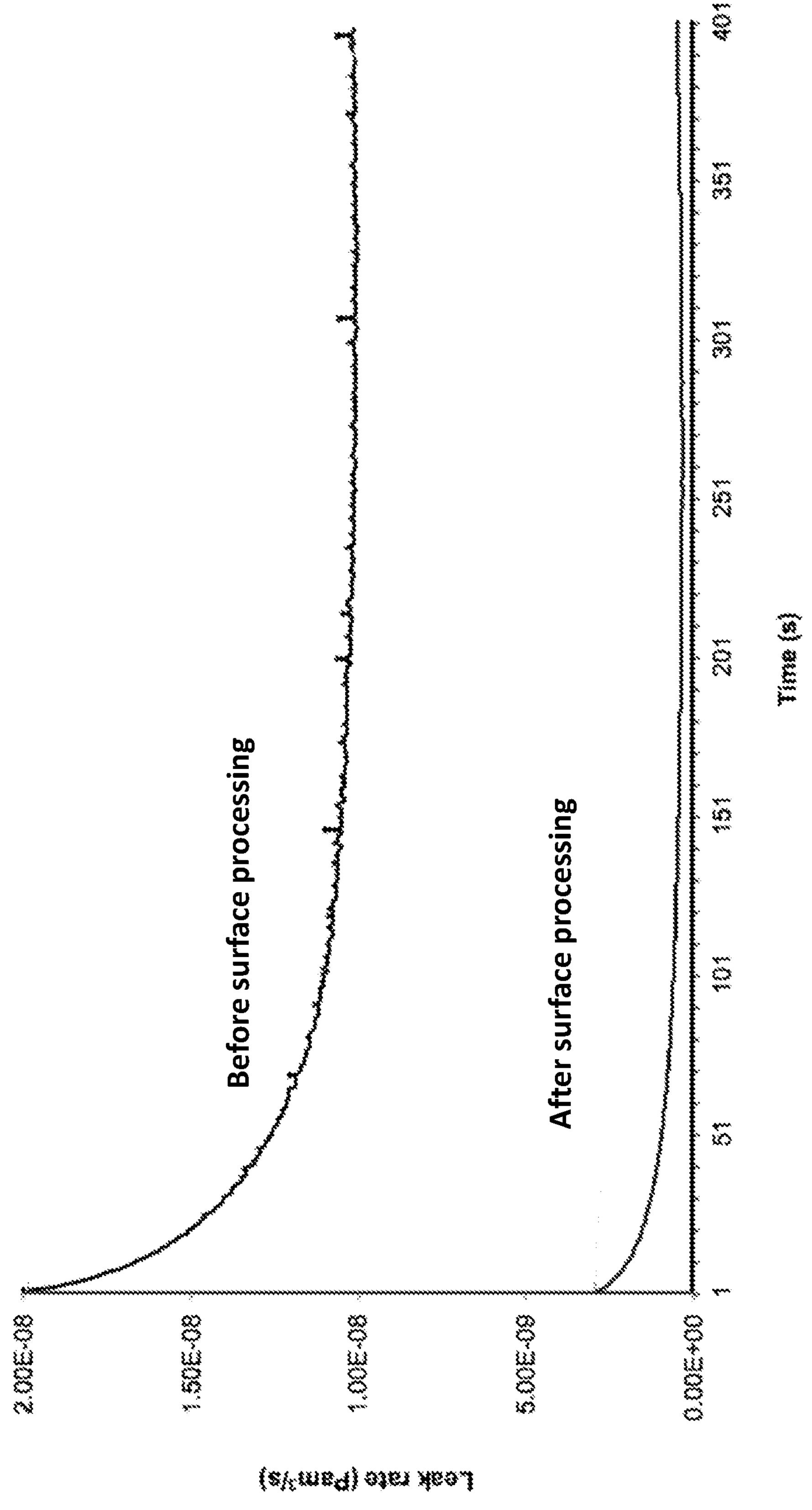
FIG. 9 is a graph illustrating the difference in leak rate of the hard disk drive before and after workpiece processing.

With reference to FIG. 8, an embodiment of a basket 170 and baseplate 800 positioned therein are shown. The basket design reduces consumption of the low surface energy solution. Each baseplate 800 is tilted vertically in the basket at an angle θ to allow the low surface energy solution to flow back to the application tank when the basket is lifted. As an example, the angle θ is within the range of 1° to 90°. The surface side 810 of the hard disk 800 with concave features is preferably facing down in the basket to avoid forming reservoirs of solution and causing flow mark on the baseplate 800 surfaces. To further minimize the loss of coating solution, baseplate 800 is preferably tilted horizontally at an angle α. As an example, the angle α is within the range of 1° to 90°. FIG. 9 shows the comparison of helium leak rate for hard disks before and after the workpiece processing as disclosed herein.

Tables 1 to 4 below illustrates the cleanliness results of hard disk drives as processed by the system and method as disclosed.

TABLE 1

| Cleanliness Testing Results: DHS(ng/part) & other | Sample 1 | Sample 2 | Sample 3 | Average |
|---|---|---|---|---|
| Total Acrylate | ND | ND | ND | ND |
| Siloxane | NA | NA | NA | NA |
| Total Methacrylate | ND | ND | ND | ND |
| Total outgas | 678 | 660 | 663 | 667 |
| LPC (Particle/$cm^2$) | 8139 | 7254 | 7409 | 7601 |
| NVR (ng/$cm^2$) | 14 | 6 | 45 | 22 |
| Hydrocarbon (ng/$cm^2$) | 187 | 110 | 180 | 159 |
| Silicone (ng/$cm^2$) | ND | ND | ND | ND |
| DOP (ng/$cm^2$) | ND | ND | ND | ND |
| Amide | ND | ND | ND | ND |

TABLE 2

| Cleanliness Testing Results: GCMS & MESA | Sample 1 | Sample 2 | Sample 3 | Average |
|---|---|---|---|---|
| | | GCMS Test | | |
| Irgasfos + Oxidised | 8 | 18 | 6 | 14 |
| Fatty Acid Ester | ND | ND | ND | ND |
| Total HC residue | 84 | 60 | 39 | 61 |

TABLE 3

| Cleanliness Testing Results: MESA | Sample 1 | Sample 2 | Sample 3 | Average |
|---|---|---|---|---|
| MESA | ND | ND | ND | ND |

TABLE 4

| Cleanliness Testing Results: IC Test | Sample 1 | Sample 2 | Sample 3 | Average |
|---|---|---|---|---|
| Flouride | 0.306 | 0.441 | — | 0.374 |
| Chloride | 0.662 | 0.910 | — | 0.786 |
| Bromide | 1.167 | 0.971 | — | 1.069 |
| Nitrate | 0.712 | 0.566 | — | 0.639 |
| Sulphate | 1.941 | 1.688 | — | 1.815 |
| Phosphate | ND | ND | — | ND |
| Total Anion | 5.559 | 5.685 | — | 5.622 |
| Total Cation | 6.828 | 6.755 | — | 6.792 |

By utilizing the system and method disclosed herein, significantly reduce the hydrocarbon contamination and other organic contaminations from casting base plates.

Figure 10:
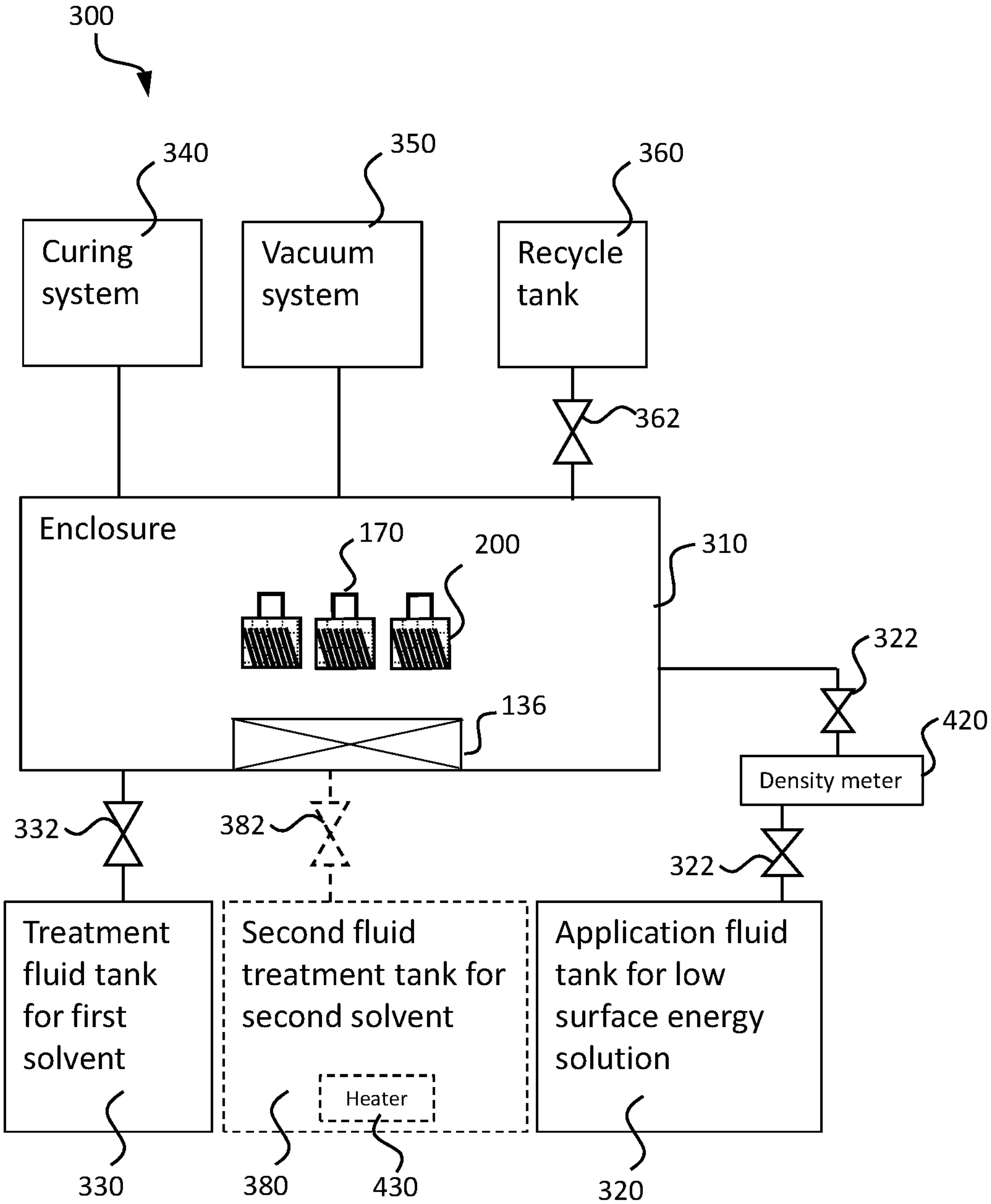
FIG. 10 is a schematic view of a workpiece processing system according to another embodiment.

In another embodiment as illustrated in FIG. 10, a workpiece processing system 300 for workpieces 200. The workpiece processing system 300 comprises an enclosure 310, an application fluid tank 320 in fluid communication with the enclosure 310, a treatment fluid tank 330 in fluid communication with the enclosure 310, a recycle tank 360 in fluid communication with the enclosure 310, a curing system 340 connected to the enclosure 310 and a vacuum system 350 connected to the enclosure 310.

In this embodiment, the workpieces 200 are held in baskets 170, and positioned in the enclosure. The vacuum system 350 is activated to reduce the pressure in the enclosure 310. Upon reaching a desired differential pressure between the enclosure 310 and the treatment fluid tank 330, a valve 332 coupled between the treatment fluid tank 330 and the enclosure 310 is activated, allowing a cleaning solvent in liquid form to flow into the enclosure cleaning the workpieces 200. Ultrasonic generator 136 may be disposed in the enclosure 310 to aid in or enhance the efficiency of the cleaning process. After cleaning, the cleaning solvent is pumped back into the treatment tank for storage resulting in the removal of contaminants from the workpieces 200. The valve 362 in the recycle tank 360 are then activated such that any residual cleaning solvent in vapor form are pushed into the recycle tank 360 for condensing and reusing.

Thereafter, the vacuum system 350 is again activated to achieve a desired differential pressure between the enclosure 310 and the application fluid tank 320. Upon reaching the desired differential pressure, a valve 322 coupled between the application fluid tank 320 and the enclosure 310 is activated, allowing a low surface energy solution to flow into the enclosure 310, coating and applying the low surface energy solution onto a surface of the workpiece and in channels of the workpiece. The low surface energy solution are then pumped back into the application fluid tank 320 for storage. Optionally, the low surface energy solution may include a filler material and a carrier solvent. Upon depositing the low surface energy solution onto surface of the workpiece and in channels of the workpiece, the carrier solvent may be allowed to evaporate to remain the filler material on surfaces of the workpiece and in channels of the workpiece. A density meter 420 may be disposed between the enclosure 310 and the application fluid tank 320 to measure a concentration of filler material in the low surface energy solution thus allowing timely refilling of fresh low surface energy solution which has a higher concentration of filler material.

Thereafter, the vacuum system 350 is again activated to achieve a desired differential pressure between the enclosure 310 and the second fluid treatment tank 380. A heater 430 is attached to tank 380 to create vapor. One or more cooling coils are attached to the fluid tank 380 to condense the vapor and reduce vapor pressure for safety purpose. Upon reaching the desired differential pressure, a valve 382 coupled between the second treatment tank 380 and the enclosure 310 is activated, allowing a second cleaning solvent in vapor form to flow into the enclosure for vapor rinsing of the workpiece, removing the low surface energy coating formed on the surface of the workpiece. In another embodiment, the second cleaning solvent is the same as the first cleaning solvent, therefore a single treatment tank 340 configured for containing cleaning solvents in both liquid and vapor form may be used. Additionally, the treatment fluid tank 330 may be configured with heating elements to boil the solvent.

The workpieces 200 are then cured using the curing system, bonding the filler material to channels of the workpiece. Thereafter, a second cleaning of the workpiece may be performed by use of cleaning solvent from the respective tanks.

Figure 11:
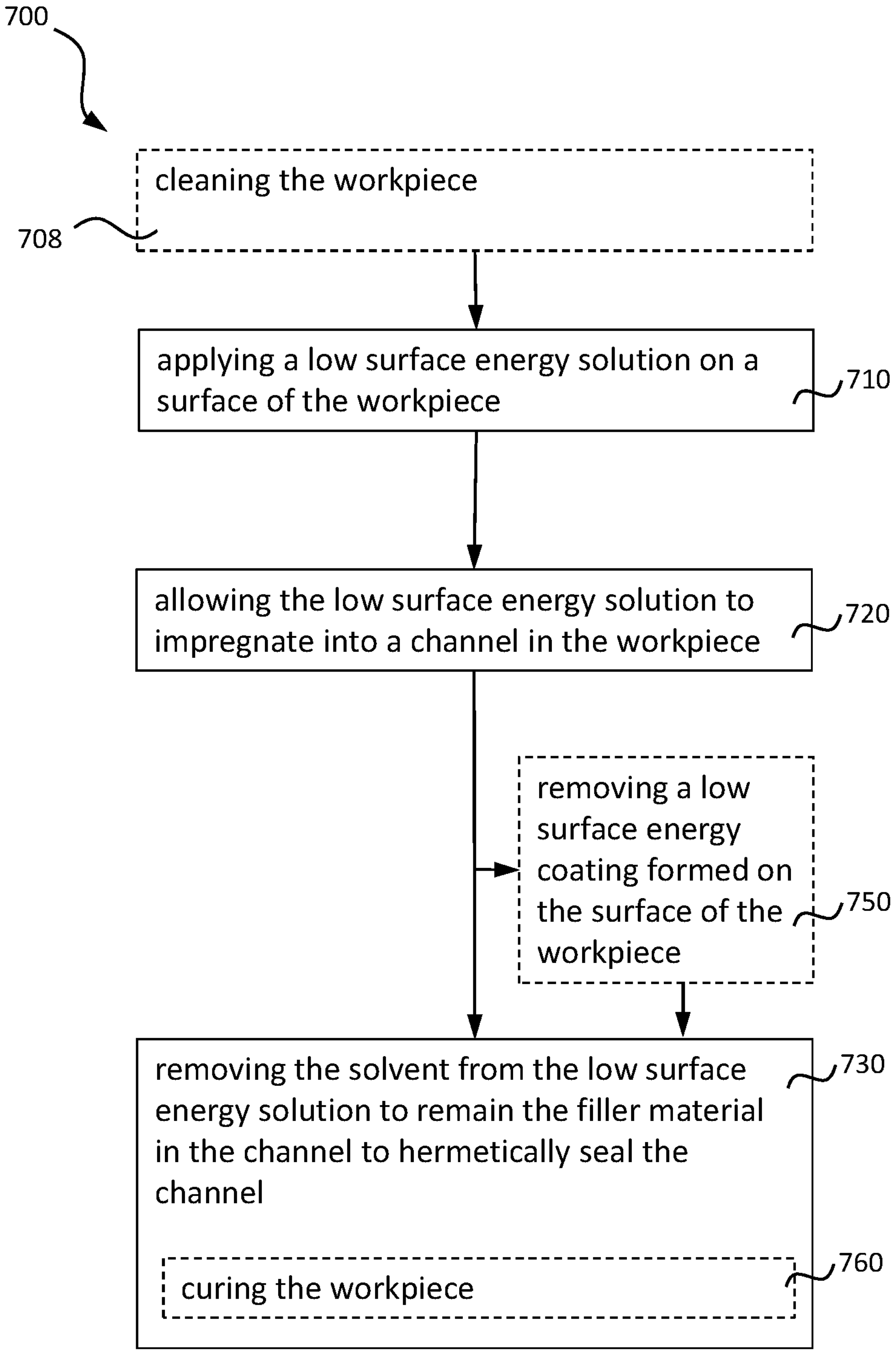
FIG. 11 shows a method flowchart of a workpiece processing method according to an embodiment.

Referring to FIG. 11, a workpiece processing method is disclosed. The workpiece processing method comprises the following: in frame 710, applying a low surface energy solution on a surface of the workpiece, the low surface energy solution includes a solvent and a filler material dissolved in the solvent; in frame 720, allowing the low surface energy solution to impregnate into a channel in the workpiece; in frame 730, removing the solvent from the low surface energy solution to remain the filler material in the channel to hermetically seal the channel.

The method may further include: in frame 708, cleaning the workpiece; in frame 750, removing a low surface energy coating formed on the surface of the workpiece; and in frame 760, curing the workpiece to bond the filler material to the channel.

The low surface energy solution may include a filler material and a carrier solvent. The filler material may be a polymer, selected from at least one of a fluorinated resin, fluorinated silane, fluorinated acrylate and a fluorinated monomer. The polymer material may be free from water-based resin.

Applying the low surface energy solution may include immersing the workpiece into the low surface energy solution, optionally the low surface energy solution is under room temperature and/or atmospheric pressure. The low surface energy solution may be under ultrasonic agitation. The workpiece may be withdrawn from the low surface energy solution under a controlled speed. Additionally, the workpiece may immersed in the low surface energy solution tilted relative to the vertical direction, for example tilted by an angle equal to or smaller than 90°.

Optionally, cleaning the workpiece may include immersing the workpiece into a first cleaning solvent under room temperature and/or atmospheric pressure. The first cleaning solvent may be under ultrasonic agitation with frequency of vibration between 10 KHz to 1000 KHz. Cleaning the workpiece may further include vapor rinsing the workpiece by condensing the first cleaning solvent in vapor form on the surface of the workpiece and drying the workpiece.

Removing the low surface energy solution from the surface of the workpiece may include vapor rinsing the workpiece by condensing a second cleaning solvent in vapor form on the surface of the workpiece. Optionally, further comprising flowing the second cleaning solvent on the surface of the workpiece via gravity. The first cleaning solvent, second cleaning solvent and/or carrier solvent may be low surface energy solvent. The first cleaning solvent, the second cleaning solvent and/or the carrier solvent may be the same chemically. The first cleaning solvent, the second cleaning solvent and/or the carrier solvent may be fluorinated solvent which is non-flammable.

Removing the carrier solvent from the low surface energy solution in the channel includes evaporating the carrier solvent. Alternatively, removing the carrier solvent from the low surface energy solution in the channel includes curing the workpiece to bond the filler material to the channel Curing may be performed under a temperature in the range from room temperature to 270° C. and/or under UV treatment. The workpiece may be a metallic casting part, a metallic workpiece, for example made from aluminium.

It will be readily understood that the components of the embodiments, as generally described and illustrated in the figures herein, may be arranged and designed in a wide variety of different configurations in addition to the described example embodiments. Thus, the following more detailed description of the example embodiments, as represented in conjunction with the figures, is not intended to limit the scope of the embodiments, as claimed, but is merely representative of example embodiments.

Reference throughout this specification to "one embodiment", "another embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, etc. In other instances, some or all known structures, materials, or operations may not be shown or described in detail to avoid obfuscation.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be effected therein by one skilled in the art without departing from the scope or spirit of the disclosure.

The invention claimed is:

1. A workpiece processing method comprising:

cleaning a metallic casting workpiece having a channel extending through the workpiece;

applying, under atmospheric pressure and at room temperature, a low surface energy solution on a surface of the workpiece by immersing the workpiece into the low surface energy solution, the low surface energy solution including a carrier solvent and a filler material dissolved in the carrier solvent;

allowing the low surface energy solution to impregnate into the channel in the workpiece;

vapor rinsing the workpiece to remove a low surface energy coating from the surface of the workpiece while retaining the filler material in the channel; and removing the carrier solvent and curing the filler material in the channel to chemically bond the filler material to the channel to hermetically seal the channel.

2. The method as recited in claim 1, wherein the filler material is a polymer selected from at least one of a fluorinated resin, fluorinated silane, fluorinated acrylate and a fluorinated monomer.

3. The method as recited in claim 1, further comprising cleaning the workpiece prior to applying the low surface energy solution on the surface of the workpiece, wherein cleaning the workpiece includes immersing the workpiece into a first cleaning solvent in liquid form.

4. The method as recited in claim 3, wherein the first cleaning solvent is under ultrasonic agitation.

5. The method as recited in claim 3 wherein cleaning the workpiece includes vapor rinsing the workpiece by condensing the first cleaning solvent in vapor form on the surface of the workpiece.

6. The method as recited in claim 1, wherein applying the low surface energy solution on the workpiece includes immersing the workpiece into the low surface energy solution, and wherein the low surface energy solution is under ultrasonic agitation.

7. The method as recited in claim 6, wherein the workpiece comprises concave features facing down to avoid forming reservoirs of solution.

8. The method as recited in claim 6, Wherein the workpiece is tilted relative to a vertical direction when immersed in the low surface energy solution.

* * * * *